US008346883B2

(12) United States Patent
Archer et al.

(10) Patent No.: US 8,346,883 B2
(45) Date of Patent: Jan. 1, 2013

(54) EFFECTING HARDWARE ACCELERATION OF BROADCAST OPERATIONS IN A PARALLEL COMPUTER

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/782,791

(22) Filed: May 19, 2010

(65) Prior Publication Data
US 2011/0289177 A1 Nov. 24, 2011

(51) Int. Cl.
*G06F 15/167* (2006.01)
(52) U.S. Cl. ........ 709/212; 709/215; 709/216; 709/220; 709/226; 709/232; 709/248; 707/630; 707/631; 710/22; 711/101; 711/148
(58) Field of Classification Search .................. 709/215, 709/216, 220, 226, 232, 248; 707/630, 631; 710/22; 711/101, 148
See application file for complete search history.

(56) References Cited

U.S. PATENT DOCUMENTS

| | | | |
|---|---|---|---|
| 4,715,032 A | 12/1987 | Nilsson | |
| 4,843,540 A | 6/1989 | Stolfo | |
| 5,105,424 A | 4/1992 | Flaig et al. | |
| 5,333,279 A | 7/1994 | Dunning | |
| 5,513,371 A | 4/1996 | Cypher et al. | |
| 5,541,914 A | 7/1996 | Krishnamoorthy et al. | |
| 5,617,538 A | 4/1997 | Heller | |
| 5,668,815 A | 9/1997 | Gittinger et al. | |
| 5,721,828 A | 2/1998 | Frisch | |
| 5,822,604 A | 10/1998 | Ogasawara et al. | |
| 5,832,215 A | 11/1998 | Kato et al. | |
| 5,864,712 A | 1/1999 | Carmichael et al. | |
| 5,878,241 A | 3/1999 | Wilkinson et al. | |

(Continued)

FOREIGN PATENT DOCUMENTS
EP  1835414 A2  9/2007

OTHER PUBLICATIONS

Edmonds, "AM++: A Generalized Active Message Framework,"pp. 1-10, Sep. 2010.

(Continued)

*Primary Examiner* — Michael Won
(74) *Attorney, Agent, or Firm* — Biggers & Ohanian, LLP

(57) ABSTRACT

Compute nodes of a parallel computer organized for collective operations via a network, each compute node having a receive buffer and establishing a topology for the network; selecting a schedule for a broadcast operation; depositing, by a root node of the topology, broadcast data in a target node's receive buffer, including performing a DMA operation with a well-known memory location for the target node's receive buffer; depositing, by the root node in a memory region designated for storing broadcast data length, a length of the broadcast data, including performing a DMA operation with a well-known memory location of the broadcast data length memory region; and triggering, by the root node, the target node to perform a next DMA operation, including depositing, in a memory region designated for receiving injection instructions for the target node, an instruction to inject the broadcast data into the receive buffer of a subsequent target node.

20 Claims, 12 Drawing Sheets

U.S. PATENT DOCUMENTS

| | | | |
|---|---|---|---|
| 5,892,923 | A | 4/1999 | Yasuda et al. |
| 5,937,202 | A | 8/1999 | Crosetto |
| 5,949,988 | A | 9/1999 | Feisullin et al. |
| 5,958,017 | A | 9/1999 | Scott et al. |
| 6,000,024 | A | 12/1999 | Maddox |
| 6,067,609 | A | 5/2000 | Meeker et al. |
| 6,076,131 | A | 6/2000 | Nugent |
| 6,108,692 | A | 8/2000 | Van Seters et al. |
| 6,212,617 | B1 | 4/2001 | Hardwick |
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,480,885 | B1 | 11/2002 | Olivier |
| 6,691,101 | B2 | 2/2004 | MacNicol et al. |
| 6,714,552 | B1 | 3/2004 | Cotter |
| 6,742,063 | B1 | 5/2004 | Hellum et al. |
| 6,754,211 | B1 | 6/2004 | Brown |
| 6,914,606 | B2 | 7/2005 | Amemiya et al. |
| 7,133,359 | B2 | 11/2006 | Weis |
| 7,171,484 | B1 * | 1/2007 | Krause et al. ............... 709/232 |
| 7,263,598 | B2 | 8/2007 | Ambuel |
| 7,284,033 | B2 | 10/2007 | Jhanji |
| 7,496,699 | B2 | 2/2009 | Pope et al. |
| 7,539,989 | B2 | 5/2009 | Blackmore et al. |
| 7,555,566 | B2 * | 6/2009 | Blumrich et al. ............ 709/249 |
| 7,590,983 | B2 | 9/2009 | Neiman et al. |
| 7,664,110 | B1 | 2/2010 | Lovett et al. |
| 7,853,639 | B2 | 12/2010 | Archer et al. |
| 8,161,268 | B2 | 4/2012 | Faraj |
| 2002/0016901 | A1 | 2/2002 | Carvey et al. |
| 2002/0054051 | A1 | 5/2002 | Ladd |
| 2002/0065984 | A1 | 5/2002 | Thompson et al. |
| 2002/0144027 | A1 | 10/2002 | Schmisseur |
| 2003/0182376 | A1 | 9/2003 | Smith |
| 2003/0188054 | A1 | 10/2003 | Yosimoto et al. |
| 2003/0212877 | A1 | 11/2003 | Dally et al. |
| 2004/0034678 | A1 | 2/2004 | Kuszmaul et al. |
| 2004/0073590 | A1 | 4/2004 | Bhanot et al. |
| 2005/0094577 | A1 | 5/2005 | Ashwood-Smith |
| 2005/0165980 | A1 | 7/2005 | Clayton et al. |
| 2005/0243711 | A1 | 11/2005 | Alicherry et al. |
| 2006/0168359 | A1 | 7/2006 | Bissessur et al. |
| 2006/0179181 | A1 | 8/2006 | Seong |
| 2006/0277323 | A1 | 12/2006 | Joublin et al. |
| 2007/0110063 | A1 | 5/2007 | Tang et al. |
| 2007/0174558 | A1 | 7/2007 | Jia et al. |
| 2007/0242611 | A1 | 10/2007 | Archer et al. |
| 2007/0245122 | A1 | 10/2007 | Archer et al. |
| 2007/0288935 | A1 | 12/2007 | Tannenbaum et al. |
| 2008/0077366 | A1 | 3/2008 | Neuse et al. |
| 2008/0127146 | A1 | 5/2008 | Liao et al. |
| 2008/0201603 | A1 | 8/2008 | Ritz et al. |
| 2008/0301683 | A1 | 12/2008 | Archer et al. |
| 2009/0006662 | A1 | 1/2009 | Chen et al. |
| 2009/0064176 | A1 | 3/2009 | Ohly et al. |
| 2009/0067334 | A1 | 3/2009 | Archer et al. |
| 2009/0154486 | A1 | 6/2009 | Archer et al. |
| 2009/0196361 | A1 | 8/2009 | Chan et al. |
| 2009/0259713 | A1 * | 10/2009 | Blumrich et al. ............ 709/201 |
| 2009/0292905 | A1 | 11/2009 | Faraj |
| 2010/0122268 | A1 | 5/2010 | Jia |
| 2010/0185718 | A1 | 7/2010 | Archer et al. |
| 2010/0191911 | A1 * | 7/2010 | Heddes et al. ................ 711/118 |
| 2011/0010471 | A1 * | 1/2011 | Heidelberger et al. ......... 710/22 |
| 2011/0119673 | A1 | 5/2011 | Bloch et al. |
| 2011/0179134 | A1 | 7/2011 | Mayo et al. |

OTHER PUBLICATIONS

Bangalore. "Extending the Message Passing Interface (MPI)", Proc. of the 1994 Conf. on Scalable Parallel Libraries, IEEE, pp. 106-118, 1995.

Bafna, "Coprocessor Design to Support MPI Primitives in Configurable Mutliprocessors;" *Integration, the VSLI Journal*, vol. 40, Issue 3, pp. 235-252, Apr. 2007.

Keller, Rainer; "MPI Development Tools and Applications for the Grid," Jun. 2003, pp. 1-12.

Tang, Hong; "Optimizing threaded MPI execution on SMP clusters," *International Conference on Supercomputer*, Jun. 2001, pp. 381-392.

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

U.S. Appl. No. 60/271,124, filed Feb. 24, 2001, pp. 12-13, 27 and 42-43.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.

Fisher, et al.; "Computing the Hough Transform on a Scar Line Array Processor"; IEEE Transactions on Pattern Analysis and Machine Intelligence; vol. II, No. 3; Mar. 1989; pp. 262-265.

Office Action, U.S. Appl. No. 11/279,620, mail date Mar. 4, 2008.
Office Action, U.S. Appl. No. 11/279,620, mail date Sep. 3, 2008.
Office Action, U.S. Appl. No. 11/279,620, mail date Dec. 29, 2008.
Office Action, U.S. Appl. No. 11/769,367, mail date Apr. 3, 2009.
Office Action, U.S. Appl. No. 11/459,387, mail date Dec. 13, 2007.
Office Action, U.S. Appl. No. 11/459,387, mail date Jul. 11, 2008.
Office Action, U.S. Appl. No. 11/459,387, mail date Mar. 18, 2009.
Office Action, U.S. Appl. No. 11/737,286, mail date Feb. 9, 2009.
Office Action, U.S. Appl. No. 11/737,209, mail date Jul. 20, 2009.
Office Action, U.S. Appl. No. 11/843,090, mail date Sep. 4, 2009.
M. Matsuda, T. Koduh, Y. Kodama, R. Takano, Y. Ishikawa, "Efficient MPI Collective Operations for Clusters in Long-and-Fast Networks," cluster, pp. 1-9, 2006 IEEE International Conference on Cluster Computing, Sep. 2006.

DADO: A Tree-Structured Machine Architecture for Production Systems, Stolfo et al. AAAI Proceedings, 1982, Columbia University.

Eunseuk Oh, An All-Reduce Operation in Star Networks Using All-to-All Broadcast Communication Patterns, 2005, 1-8.

Xin Yuan, Bandwidth Efficient All-reduce Operation on Tree Topologies, 2001, 1-8.

Final Office Action, U.S. Appl. No. 11/769,367, mail date Sep. 28, 2010.
Final Office Action, U.S. Appl. No. 12/053,842, mail date Oct. 18, 2010.
Advisory Action, U.S. Appl. No. 12/053,842, mail date Jan. 11, 2011.
Office Action, U.S. Appl. No. 12/053,842, mail date Mar. 1, 2011.
Office Action, U.S. Appl. No. 12/503,902, mail date Oct. 6, 2010.
Office Action, U.S. Appl. No. 12/060,492, mail date May 27, 2010.
Final Office Action, U.S. Appl. No. 12/060,492, mail date Dec. 2, 2010.
Office Action, U.S. Appl. No. 12/124,763, mail date Oct. 14, 2010.
Office Action, U.S. Appl. No. 12/124,756, mail date Oct. 18, 2010.
http://betterexplained.com/articles/swap-two-variables-using-xor, Jan. 16, 2007, betterexplained.com.
Office Action, U.S. Appl. No. 11/754,782, mail date Jun. 23, 2011.
Final Office Action, U.S. Appl. No. 12/053,842, mail date May 23, 2011.
Office Action, U.S. Appl. No. 12/176,816, mail date Jun. 10, 2011.
Office Action, U.S. Appl. No. 11/754,740, mail date Apr. 11, 2011.
Final Office Action, U.S. Appl. No. 12/124,756, mail date Mar. 28, 2011.
Notice of Allowance, U.S. Appl. No. 11/754,782, mail date Dec. 16, 2011.

Notice of Allowance, U.S. Appl. No. 11/754,740, mail date Nov. 8, 2011.
Notice of Allowance, U.S. Appl. No. 12/053,842, mail date Oct. 14, 2011.
Office Action, U.S. Appl. No. 12/060,492, mail date Jul. 16, 2012.
Notice of Allowance, U.S. Appl. No. 12/124,756, mail date Dec. 14, 2011.
Office Action, U.S. Appl. No. 12/124,745, mail date Jun. 15, 2012.
Office Action, U.S. Appl. No. 12/770,286, mail date Jul. 5, 2012.
Office Action, U.S. Appl. No. 12/760,020, mail date Feb. 13, 2012.
Notice of Allowance, U.S. Appl. No. 12/760,020, mail date Jul. 30, 2012.

* cited by examiner

EFFECTING HARDWARE ACCELERATION OF BROADCAST OPERATIONS IN A PARALLEL COMPUTER

BACKGROUND OF THE INVENTION

1. Field of the Invention

The field of the invention is data processing, or, more specifically, methods, apparatus, and products for effecting hardware acceleration of broadcast operations in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

SUMMARY OF THE INVENTION

Methods, apparatus, and products for effecting hardware acceleration of broadcast operations in a parallel computer are disclosed. In embodiments of the present invention, the parallel computer includes a number of compute nodes that are organized for collective operations via a data communications network, with each compute node having a receive buffer. Effective hardware acceleration in accordance with embodiments of the present invention includes: establishing a network topology for the data communications network; selecting, in dependence upon the network topology, a schedule for a broadcast operation; depositing, by a root node of the topology, broadcast data in a target node's receive buffer, including performing a DMA operation with a well-known memory location for the target node's receive buffer; depositing, by the root node in a memory region designated for storing broadcast data length for the target node, a length of the broadcast data, including performing a DMA operation with a well-known memory location of the broadcast data length memory region; and triggering, by the root node, the target node to perform a next DMA operation, including depositing, in a memory region designated for receiving injection instructions for the target node, an instruction to inject the broadcast data into the receive buffer of a subsequent target node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
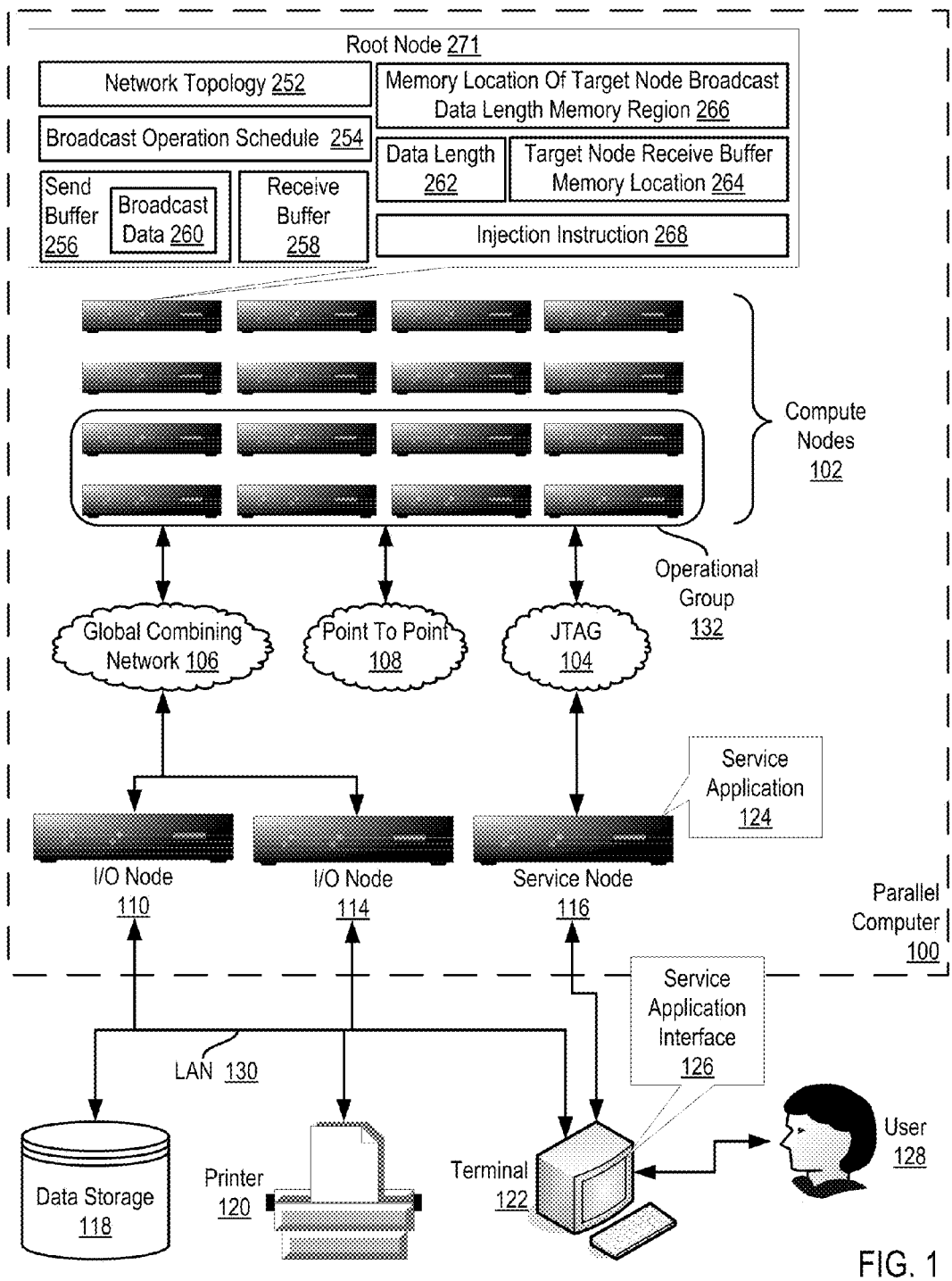
FIG. 1 illustrates an exemplary system for effecting hardware acceleration of broadcast operations in a parallel computer according to embodiments of the present invention.

Exemplary methods, apparatus, and products for effecting hardware acceleration of broadcast operations in a parallel computer in accordance with embodiments of the present invention are described with reference to the accompanying drawings, beginning with FIG. 1. FIG. 1 illustrates an exemplary system for effecting hardware acceleration of broadcast operations in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |

-continued

| MPI_LOR | logical or |
|---|---|
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The system of FIG. 1 operates generally for effecting hardware acceleration of broadcast operations in a parallel computer (100) according to embodiments of the present invention. A broadcast operation is a collective operation in which a root node effectively sends data to all other compute nodes in a group of nodes organized for collective operations. The root node is said to 'effectively' send the data to other compute nodes, because in many cases the root node does not directly send the data, referred to in this specification as broadcast data, to each individual node, but instead sends the data to one node, which passes the data to another, and so on until all nodes of a group organized for collective operations have received the broadcast data.

Effecting hardware acceleration of broadcast operations in a parallel computer (100) according to embodiments of the present invention may be carried out with various well-known memory locations. The phrase 'well known memory location' as used in this specification refers to a memory location provided by any module, mechanism, device, or the like separate from a messaging module in a multicore or multinode system, such as a parallel computer. In other words, a well known memory location is a 'pre-shared' value in a multicore or multimode system that need not be generated or derived at the time of the core or node's use of the value. Thus, compute nodes, at the outset of messaging operations, have a common understanding or agreement with regard to one or more particular "well known" memory locations.

A memory location may also be considered 'well-known' from the perspective of a compute node using the memory location for messaging in that the compute node need not request, discover, or take any active step to acquire the memory location prior to using the memory location for messaging. Instead, the 'well-known' memory address may be provided to the compute node. In some embodiments, for example, a user-level application may configure a compute node, at application startup, with a memory location and, in other exemplary embodiments, a messaging module of a root node may provide memory locations to other compute nodes upon establishment of a network topology for use in data communications among the compute nodes within the network topology. In this way, a compute node is effectively 'preconfigured,' or 'pre-shared' as mentioned above, with one or more memory addresses—well-known memory addresses—for use in effective hardware acceleration of broadcast operations in a parallel computer in accordance with embodiments of the present invention.

In the example of FIG. 1, each compute node (102) has a receive buffer (258) and the root node (271) is configured with a send buffer (256). The system of FIG. 1 may operate for effective hardware acceleration of broadcast operations among the compute nodes (102) of FIG. 1, by establishing a network topology (252) for the data communications network and selecting, in dependence upon the network topology (252), a schedule (254) for a broadcast operation. The root node (217) may also deposit broadcast data (260) in a target node's receive buffer (258), including performing a DMA operation with a well-known memory location (264) for the target node's receive buffer (258). The root node (271) may also deposit, in a memory region designated for storing broadcast data length for the target node, a length (262) of the broadcast data, including performing a DMA operation with a well-known memory location (266) of the broadcast data length memory region. The root node (271) may also trigger the target node to perform a next DMA operation, including depositing, in a memory region designated for receiving injection instructions for the target node, an instruction (268) to inject the broadcast data into the receive buffer of a subsequent target node.

The arrangement of nodes, networks, and I/O devices making up the exemplary system illustrated in FIG. 1 are for explanation only, not for limitation of the present invention. Data processing systems capable of effecting hardware acceleration of broadcast operations in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers configured according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Effecting hardware acceleration of broadcast operations according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of runtime optimization of an application executing on the parallel computer according to embodiments of the present invention. The compute node (152) of FIG. 2 includes one or more processing cores (164) as well as random access memory (RAM') (156). The processing cores (164) are connected to RAM (156) through a high-speed memory bus (154) and through a bus adapter (194) and an extension bus (168) to other components of the compute node (152). Stored in RAM (156) is an application program (208), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
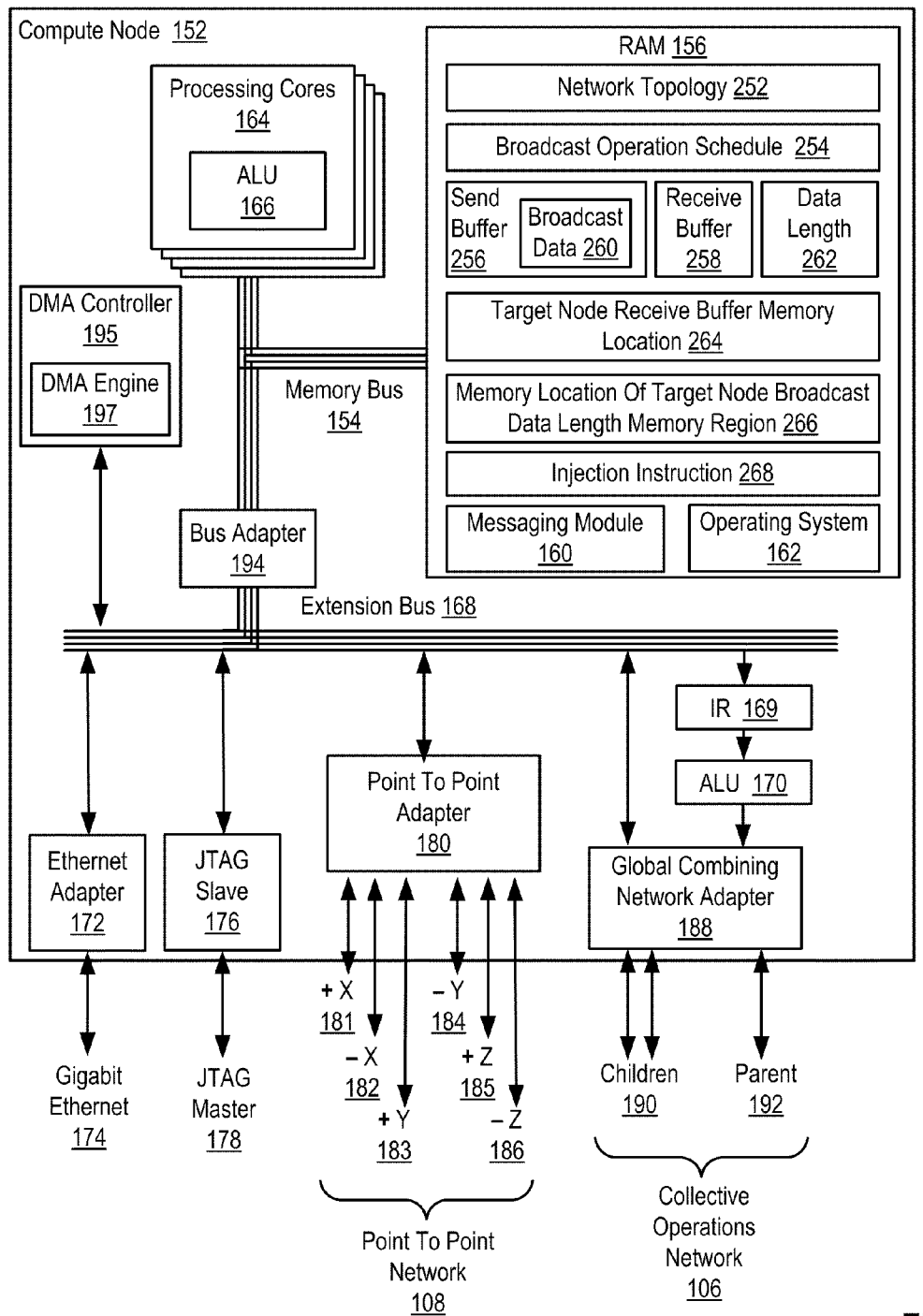
FIG. 2 sets forth a block diagram of an exemplary compute node useful in a parallel computer capable of effecting hardware acceleration of broadcast operations according to embodiments of the present invention.

The messaging module (160), DMA controller (195), and DMA engine (197) of FIG. 2 may operate together to effect hardware acceleration of broadcast operations in a parallel computer of which the compute node (152) is a part. The compute node (152) in the example of FIG. 2 is organized with other compute nodes for collective operations via a data communications network (106). Each of the compute nodes (152) of the network (106) is configured with a receive buffer (258). Although the compute node (152) of FIG. 2 may operate as either a target node or a root node, effective hardware acceleration of broadcast operations in a parallel computer in accordance with embodiments of the present invention is described here as if compute node (152) operates as a root node.

The compute node (152) of FIG. 2 may operate for effective hardware acceleration of broadcast operations among the compute nodes of the network (106), by establishing a network topology (252) for the data communications network and selecting, in dependence upon the network topology (252), a schedule (254) for a broadcast operation. The root node (152) may also deposit broadcast data (260) in a target node's receive buffer (258) by performing one or more DMA operations, with a well-known memory location (264) for the target node's receive buffer (258). In the example of FIG. 2, the messaging module (160) may prepare the broadcast data (260) in memory for DMA transfers and provide the target address (264), source address, and data length (262) to DMA controller (195) for processing by the DMA engine (197).

The root node (152) may also deposit, in a memory region designated for storing broadcast data length for the target node, a length (262) of the broadcast data in a similar manner: by performing one or more DMA operations with a well-known memory location (266) of the broadcast data length memory region. The root node (271) may also trigger the target node to perform a next DMA operation by depositing, in a memory region designated for receiving injection instructions for the target node, an instruction (268) to inject the broadcast data into the receive buffer of a subsequent target node.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems that effect hardware acceleration of broadcast operations in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in effecting hardware acceleration of broadcast operations in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
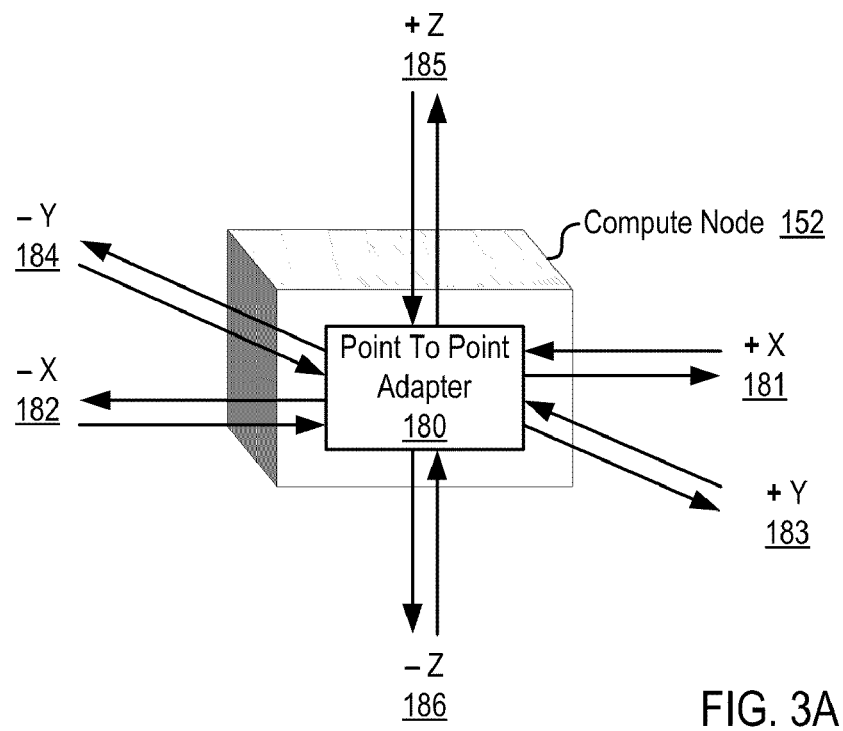
FIG. 3A illustrates an exemplary Point To Point Adapter useful in systems capable of effecting hardware acceleration of broadcast operations in a parallel computer according to embodiments of the present invention.

For further explanation, FIG. 3A illustrates an exemplary Point To Point Adapter (180) useful in systems capable of effecting hardware acceleration of broadcast operations in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
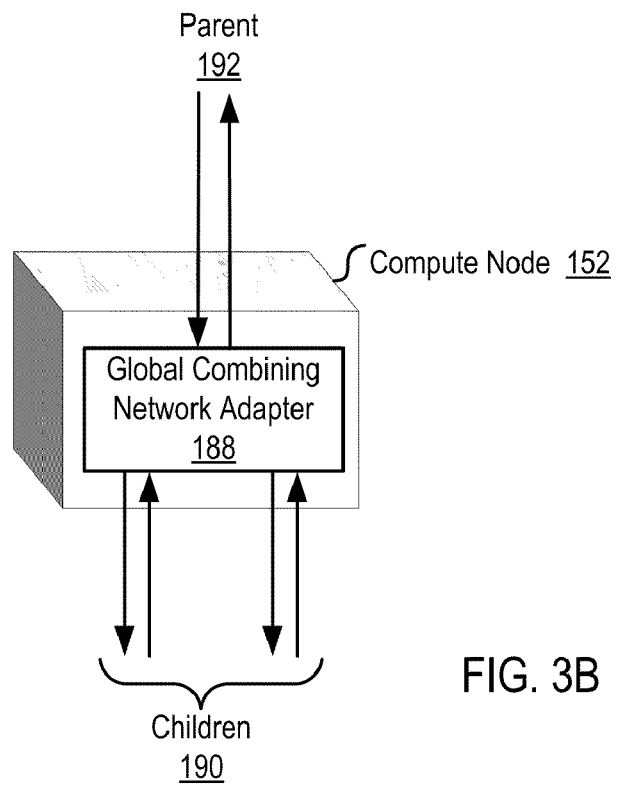
FIG. 3B illustrates an exemplary Global Combining Network Adapter useful in systems capable of effecting hardware acceleration of broadcast operations in a parallel computer according to embodiments of the present invention.

For further explanation, FIG. 3B illustrates an exemplary Global Combining Network Adapter (188) useful in systems capable of effecting hardware acceleration of broadcast operations in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
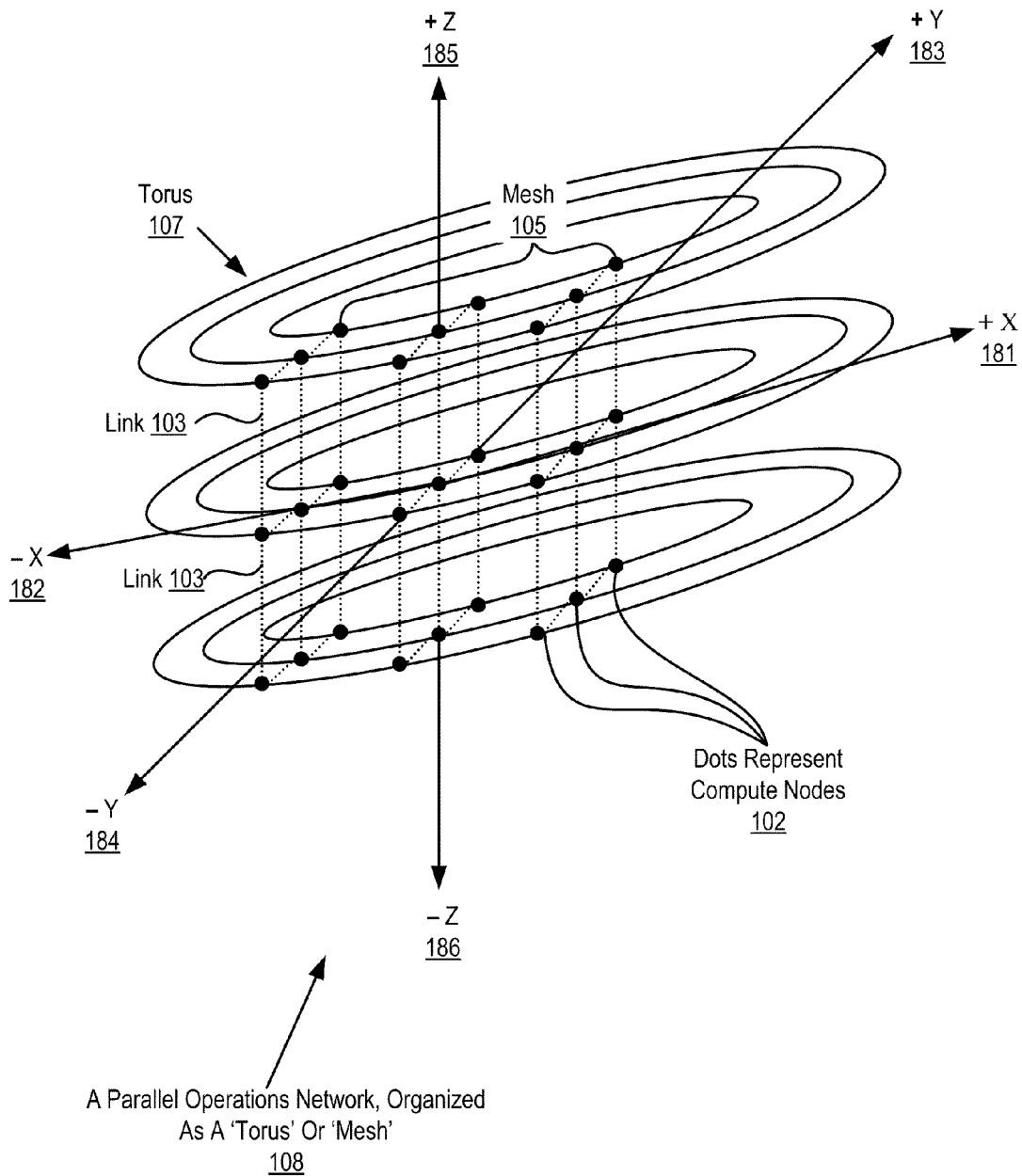
FIG. 4 sets forth a line drawing illustrating an exemplary data communications network optimized for point to point operations useful in systems capable of effecting hardware acceleration of broadcast operations in a parallel computer in accordance with embodiments of the present invention.

For further explanation, FIG. 4 sets forth a line drawing illustrating an exemplary data communications network (108) optimized for point to point operations useful in systems capable of effecting hardware acceleration of broadcast operations in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in effecting hardware acceleration of broadcast operations in a parallel computer in accordance with embodiments of the present invention may contain only a few compute nodes or may contain thousands of compute nodes.

Figure 5:
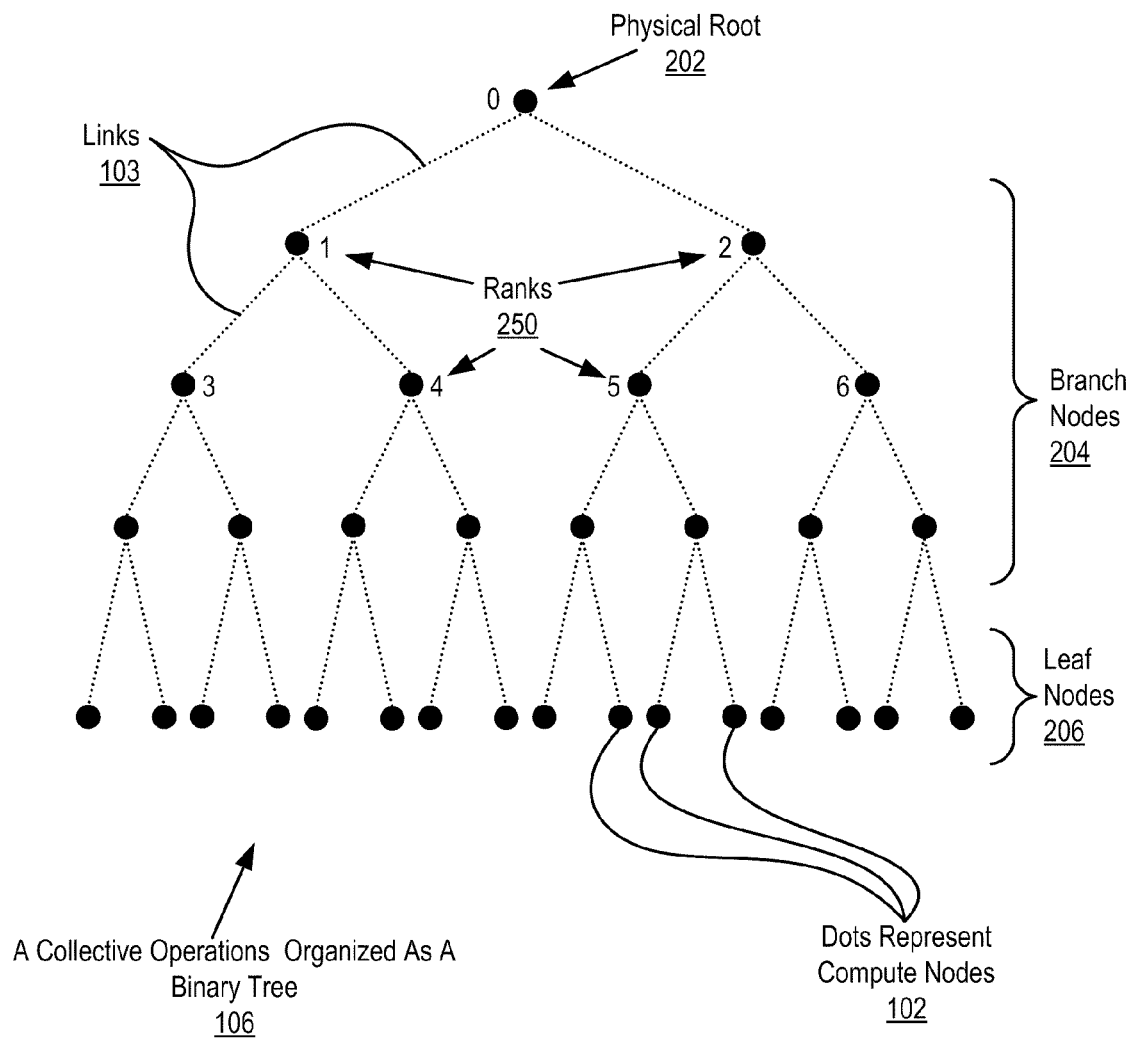
FIG. 5 sets forth a line drawing illustrating an exemplary data communications network optimized for collective operations useful in systems capable of effecting hardware acceleration of broadcast operations in a parallel computer in accordance with embodiments of the present invention.

For further explanation, FIG. 5 sets forth a line drawing illustrating an exemplary data communications network (106) optimized for collective operations useful in systems capable of effecting hardware acceleration of broadcast operations in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems that effect hardware acceleration of broadcast operations in a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
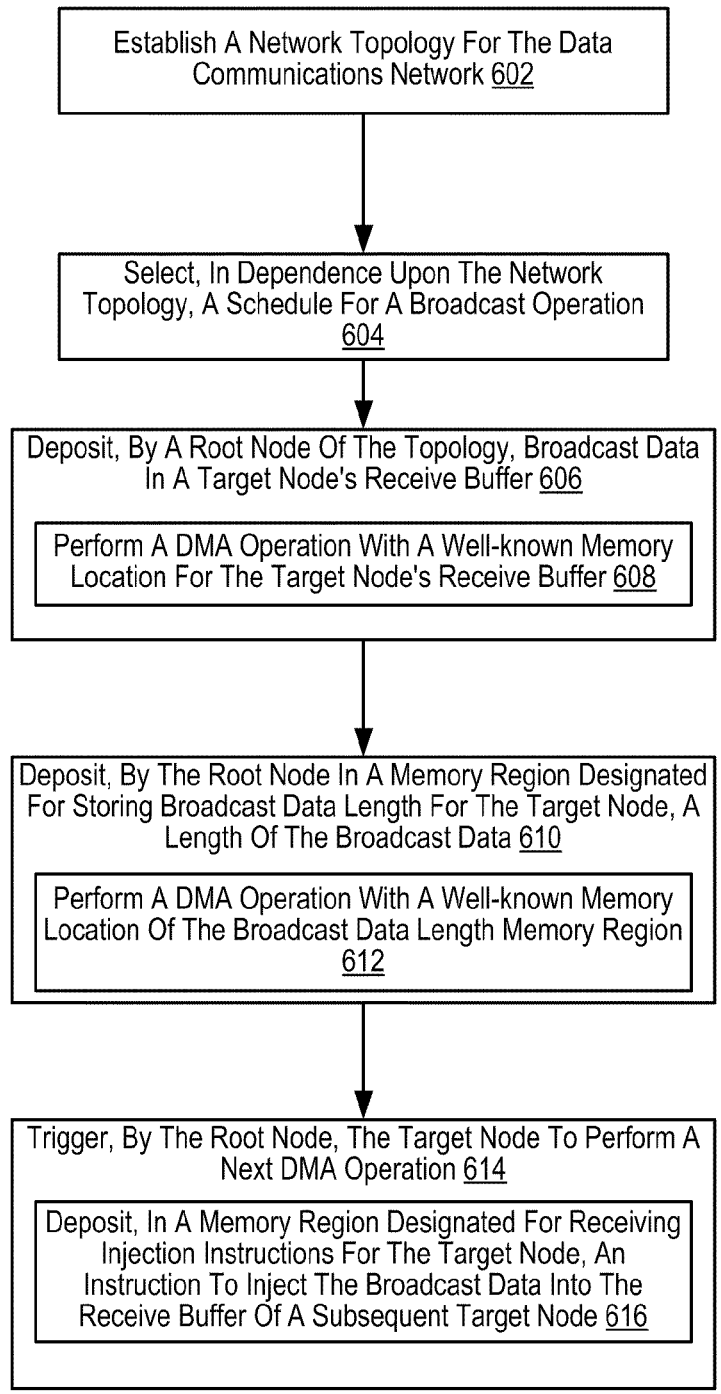
FIG. 6 sets forth a flow chart illustrating an exemplary method of effecting hardware acceleration of broadcast operations in a parallel computer according to embodiments of the present invention.

For further explanation, FIG. 6 sets forth a flow chart illustrating an exemplary method of effecting hardware acceleration of broadcast operations in a parallel computer according to embodiments of the present invention. The method of FIG. 6 may be carried out in parallel computer, similar to the parallel computer (100) depicted in FIG. 1. Such a parallel computer (100) includes a plurality of compute nodes (102 on FIG. 1) organized for collective operations via a data communications network (106) with each compute node having a receive buffer.

The method of FIG. 6 includes establishing (602) a network topology for the data communications network. A network topology as the term is used here may refer to any combination of: a definition of a set of compute nodes; a specification of data communication links coupling compute nodes for data communications; a specification of a rank of each node; a specification, for each compute, of a well-known memory location of another compute node's receive buffer; a specification of a well-known memory location of a broadcast data length memory region of another compute node; a specification of a memory address to which to send injection instructions; and so on as will occur to readers of skill in the art.

The method of FIG. 6 also includes selecting (604), in dependence upon the network topology, a schedule for a broadcast operation. A schedule for a broadcast operation as the term is used in this specification is a specification of each phase of a broadcast operation, defining compute nodes involved in each phase and their respective operations to carry out in each phase. Selecting (604) a schedule may be carried out by a system administrator by selection one among many different schedules corresponding to a particular network topology. If the compute nodes are organized into a torus for example, a system administrator or other user may select a broadcast schedule corresponding to a torus network, while a system administrator may select a broadcast schedule corresponding to a square network topology when the compute nodes are organized into a square network topology. A broadcast schedule may also define well-known memory locations for each compute node: injection instruction storage locations; memory addresses of receive buffers, memory addresses for broadcast data length memory regions, and so on. That is, instead of defining such addresses when establishing a network topology, as described above, in some embodiments the broadcast schedule—which is provided to the compute nodes—specifies such well-known memory locations.

The method of FIG. 6 continues by depositing (606), by a root node of the topology and in accordance with the selected schedule, broadcast data in a target node's receive buffer. In the method of FIG. 6, depositing (606) broadcast data in a target node's receive buffer is carried out by performing (608) a DMA operation with a well-known memory location for the target node's receive buffer.

The method of FIG. 6 also includes depositing (610), by the root node in a memory region designated for storing broadcast data length for the target node, a length of the broadcast data. In the method of FIG. 6, depositing (610) a length of the broadcast data is carried out by performing (612) a DMA operation with a well-known memory location of the broadcast data length memory region.

As explained below in detail with respect to FIG. 8, each compute node in the network topology is configured with a well-known memory location of another compute node's receive buffer when the network topology is established (602), where the another compute node represents a target node. The combination of the memory location of a target node's receive buffer, a pointer to the received broadcast data, and the broadcast data length effectively comprises a DMA data descriptor that specifies data to be transferred to a target. The DMA data descriptor is explained in further detail below.

The method of FIG. 6 also includes triggering (614), by the root node, the target node to perform a next DMA operation. In the method of FIG. 6, triggering the target node to perform a next DMA operation is carried out by depositing (616), in a memory region designated for receiving injection instructions for the target node, an instruction to inject the broadcast data into the receive buffer of a subsequent target node. Performing the next DMA operation may be carried out by with one or more DMA operations initiated by the target node to carry out: storing the broadcast data, as specified by the broadcast data length, in the subsequent target node's receive buffer; storing the broadcast data length in the subsequent target node's broadcast data length memory region; and sending an injection instruction to the subsequent target node if the broadcast data has not been sent to all nodes in the network topology.

Although the broadcast operation is described with only three compute nodes—one root node, one target node, and one subsequent target nodes—various embodiments of effective hardware acceleration of broadcast operations in accordance with embodiments of the present invention may be implemented with any number of compute nodes. In addition, various enhancements, increasing hardware acceleration of such broadcast operations may also be implemented. For further explanation, therefore, FIG. 7 sets forth a flow chart illustrating a further exemplary method of effecting hardware acceleration of broadcast operations in a parallel computer according to embodiments of the present invention. Like the method of FIG. 6, the method of FIG. 7 may also be carried out in a parallel computer similar to the parallel computer (100) of FIG. 1. In such a parallel computer a number of compute nodes (102 on FIG. 1) are organized for collective operations via a data communications network (106) with each compute node having a receive buffer.

Figure 7:
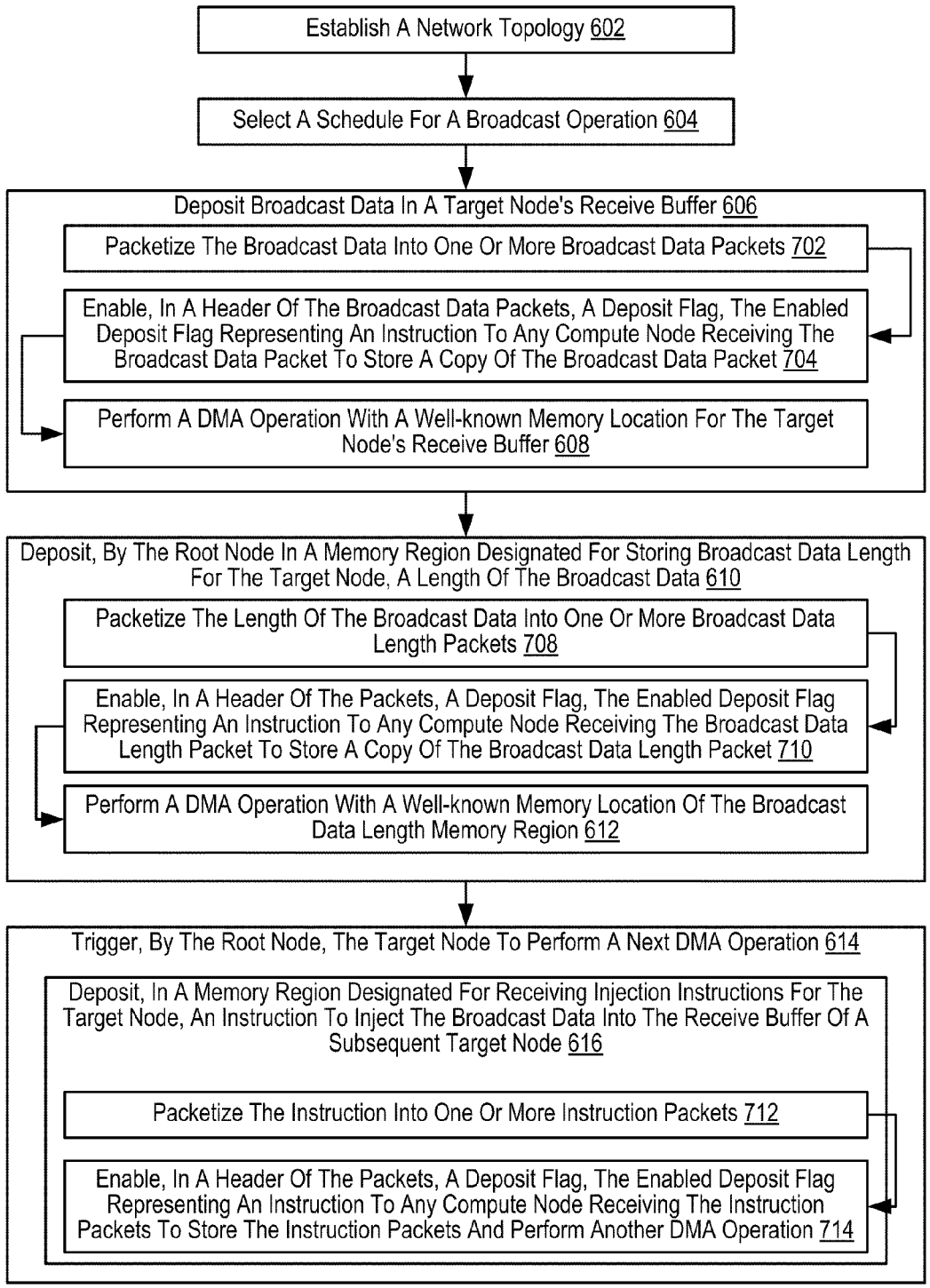
FIG. 7 sets forth a flow chart illustrating a further exemplary method of effecting hardware acceleration of broadcast operations in a parallel computer according to embodiments of the present invention.

The method of FIG. 7 is also similar to the method of FIG. 6 including, as it does, establishing (602) a network topology; selecting (604) a schedule for a broadcast operation; depositing (606) broadcast data in a target node's receive buffer; depositing (610) a length of the broadcast data; and triggering (614) the target node to perform a next DMA operation. The method of FIG. 7 differs from the method of FIG. 6, however, in that in the method of FIG. 7, depositing (606) broadcast data in a target node's receive buffer includes out by packetizing (702) the broadcast data into one or more broadcast data packets and enabling (704), in a header of the broadcast data packets, a deposit flag.

Packetizing (702) the broadcast data may be carried out by a number of data chunks of a predefined size of the broadcast data to be sent along to the target node. The term 'packet' is used here to generally describe a chunk of data that has been formatted for delivery from a compute node to a target node via DMA operations in a parallel computer. Preparing a chunk of the broadcast data to be send along to the target node by DMA operations may include adding a header and/or a tail to a chunk of broadcast data—thus forming a 'packet' as the term is used here. A header or tail of a data chunk may be a collection of bits or bytes. The header and tail may include any or none of the following: a size of the packet, an identifier of an order of the packet with regard to other packets to be sent, a target memory location of the data, an error correction value, a checksum value, and so on as will occur to readers of skill in the art. The header may also include a deposit flag. A deposit flag is a data value that, when enabled, represents an instruction to any compute node receiving the broadcast data packet to store a copy of the broadcast data packet. A deposit flag may, for example, be implemented as a single, pre-designated bit of a multi-bit or multi-byte header. When the bit is set to a value of '1,' the deposit flag is considered enabled. When the bit is set to a value of '0,' the deposit flag is not enabled.

Broadcast data sent from a root node to a target node may be passed along to the target node by one or more intermediary nodes. That is, a root node may deposit (606) broadcast data in a target node's receive buffer by sending by the root node's DMA engine the broadcast data along to an intermediary node which then passes the broadcast data along to the target node. If the deposit flag in the broadcast data is enabled, however, the intermediary node, in addition to passing along the broadcast data to the target node, also stores the broadcast data locally, in the intermediary node's receive buffer. In this way, the root node, by one or more DMA operations only to the target node, may deposit broadcast data in the receive buffers of any number of compute nodes including the target node and all intermediary nodes between (in terms of network topology) the root and the target.

Also in the method of FIG. 7, depositing (610) a length of the broadcast data, includes packetizing (708) the length of the broadcast data into one or more broadcast data length packets and enabling (710), in a header of the broadcast data length packets, a deposit flag. Any data packets sent from a root node to a target node may include a deposit flag that represents, to a compute node that receives the data packet, an instruction to copy the packet locally. In the case of the broadcast data length, an intermediary compute node—any compute node between the root and target in the network topology—that receives the broadcast data length packet will store a copy of the broadcast data length locally.

Also in the method of FIG. 7, depositing (616) an instruction to inject the broadcast data into the receive buffer of a subsequent target node includes packetizing (712) the instruction into one or more instruction packets and enabling (714), in a header of the instruction packets, a deposit flag. The enabled deposit flag in the instruction packets represents an instruction to any compute node (any intermediary nodes) receiving the instruction packets to store the instruction packets and perform another DMA operation. That is, at this point in the method of FIG. 7 due to the deposit flags described above, any compute node between the root and target node, as well as the target node itself, has stored broadcast data in a local receive buffer, has stored the broadcast data length locally, and has received an instruction to perform another DMA operation. Responsive to the received injection instruction and using the broadcast data length to perform DMA operations, the target node and each compute node between the root and target, may send along the contents of the compute node's local receive buffer (the broadcast data) to another compute node.

Operation of non-root nodes after receiving broadcast data, broadcast data length, and an injection instruction, is described below in detail with respect to FIG. 8, using as an exemplary compute node, the target node. For further explanation, therefore, FIG. 8 sets forth a flow chart illustrating a further exemplary method of effecting hardware acceleration of broadcast operations in a parallel computer according to embodiments of the present invention. Like the method of FIG. 6, the method of FIG. 8 may also be carried out in a parallel computer similar to the parallel computer (100) of FIG. 1. In such a parallel computer a number of compute nodes (102 on FIG. 1) are organized for collective operations via a data communications network (106) with each compute node having a receive buffer.

Figure 8:
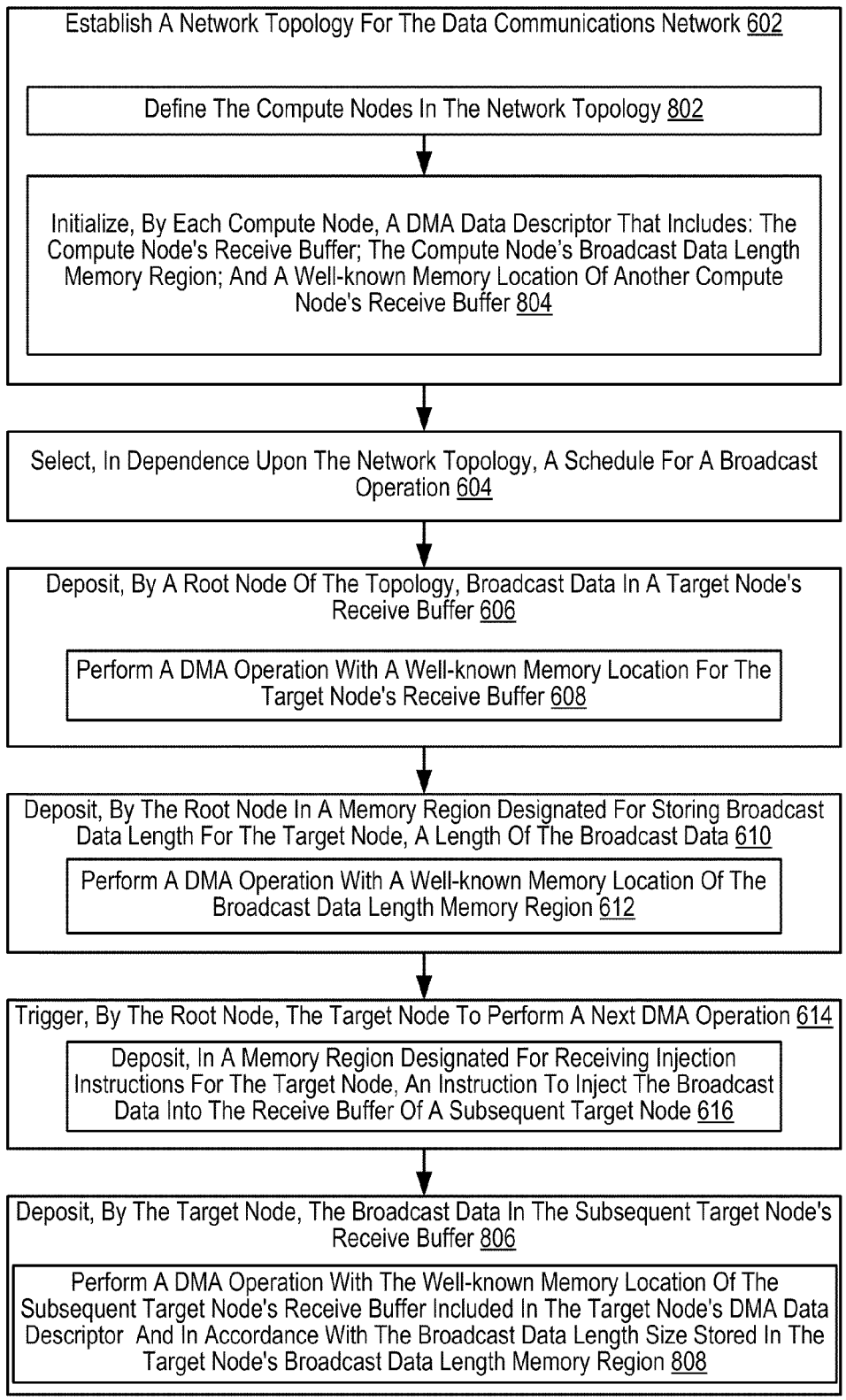
FIG. 8 sets forth a flow chart illustrating a further exemplary method of effecting hardware acceleration of broadcast operations in a parallel computer according to embodiments of the present invention.

The method of FIG. 8 is also similar to the method of FIG. 6 including, as it does, establishing (602) a network topology; selecting (604) a schedule for a broadcast operation; depositing (606) broadcast data in a target node's receive buffer; depositing (610) a length of the broadcast data; and triggering (614) the target node to perform a next DMA operation. The method of FIG. 8 differs from the method of FIG. 6, however, in that in the method of FIG. 8, establishing (602) a network topology is carried out by defining (802) the compute nodes in the network topology and initializing (804), by each compute node, a DMA data descriptor that includes: the compute node's receive buffer; the compute node's broadcast data length memory region; and a well-known memory location of another compute node's receive buffer.

Establishing (602) a network topology may be carried out in various ways including, for example, specifying a number of compute nodes included in the network topology, specifying data communication links connecting compute nodes for data communications, specifying a rank of each node, specifying, for each compute, a well-known memory location of that compute node's target compute node (more specifically, the receive buffer of the target compute node), specifying well-known memory locations of broadcast data length memory regions of target compute nodes, specifying memory addresses to which to send injection instructions, and so on as will occur to readers of skill in the art. All of which, may be carried out in establishing a communicator—an identified group of processes to carry out collective operations, where each processes, in the examples provided in the specification, executes on a single compute node. As such, in the examples provided here, but not limited to such, a communicator specifies a number of compute nodes among which to carry out collective operations.

Initializing (804), by each compute node, a DMA data descriptor may be carried out by allocating a memory region for the compute node's receive buffer, maintaining a pointer to a starting memory address of the receive buffer, allocating a memory region for the compute node's broadcast data length memory region, storing a pointer to the memory location of the broadcast data length memory region; and storing a starting memory address of another compute node's receive buffer. That is, a DMA data descriptor is said to "include" the compute node's receive buffer in that the DMA data descriptor may include a pointer to receive buffer and the DMA data descriptor is said to "include" the compute node's broadcast data length memory region in that the DMA data descriptor may include a pointer to the broadcast data length memory region.

A data descriptor typically identifies data at a memory location. One way in which a typical data descriptor may identify data at a memory location is by use of a pointer and offset. The pointer identifies a starting memory address of a segment of memory containing data, while the offset defines the length, or size, of the memory segment. Data descriptors may be used, and often are used, by DMA engines to carry out DMA transfers. Such data descriptors in addition to identifying a data chunk at a memory location may also identify a target location for the data chunk to be transferred. A DMA engine may, for example, be configured to access an array of data descriptors, with each data descriptor identifying a chunk of data, by memory location and an offset, an a target location to transfer the chunk of data to via a DMA operation.

In the method of FIG. 8, a compute node initializes, upon establishment of a network topology, a DMA data descriptor for use in broadcasting data in accordance with embodiments of the present invention. The DMA data descriptor of FIG. 8 operates, and is used, in a manner similar to other data descriptors in that the DMA data descriptor identifies a data chunk to be transferred (broadcast data stored in the compute node's receive buffer), by memory location (memory address of the beginning of the broadcast data in the receive buffer) and offset (broadcast data length), and specifies a target location to transfer the data via DMA operation (the well-known location of another compute node's receive buffer).

The method of FIG. 8 also includes depositing (806), by the target node, the broadcast data in the subsequent target node's receive buffer. In the method of FIG. 8, depositing broadcast data in the subsequent target node's receive buffer is carried out by performing (808) a DMA operation with the well-known memory location of the subsequent target node's receive buffer included in the target node's DMA data descriptor and in accordance with the broadcast data length size stored in the target node's broadcast data length memory region. That is, the DMA data descriptor initialized when establishing the network topology and updated, by the root node, with the broadcast data and broadcast data length, is used exactly like a typical DMA data descriptor in performing (808) a DMA operation. While a typical DMA data descriptor may identify a data chunk to transfer by a starting memory address of the data chunk, the size of the data chunk, and a target memory address, here, the DMA data descriptor of the target node specifies the broadcast data (data chunk to transfer) by the memory location of the target node's receive buffer (a starting memory address of the data chunk), the size of the data chunk, (the broadcast data length), and the well-known location of the subsequent target node's receive buffer (the target memory address).

Figure 9:
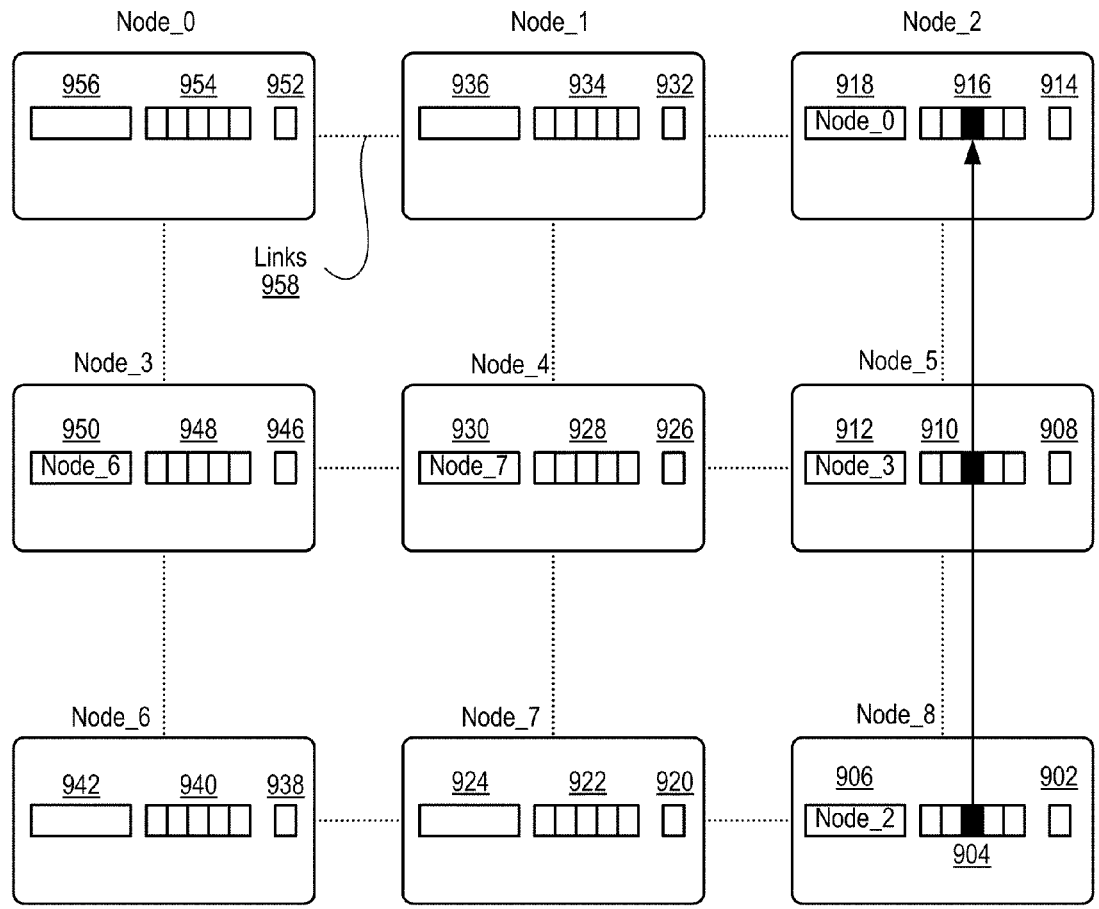
FIG. 9 sets forth a line drawing illustrating exemplary data flow among a number of compute nodes configured in a network topology of a parallel computer in which hardware acceleration of broadcast operations is effected according to embodiments of the present invention.
Figure 10:
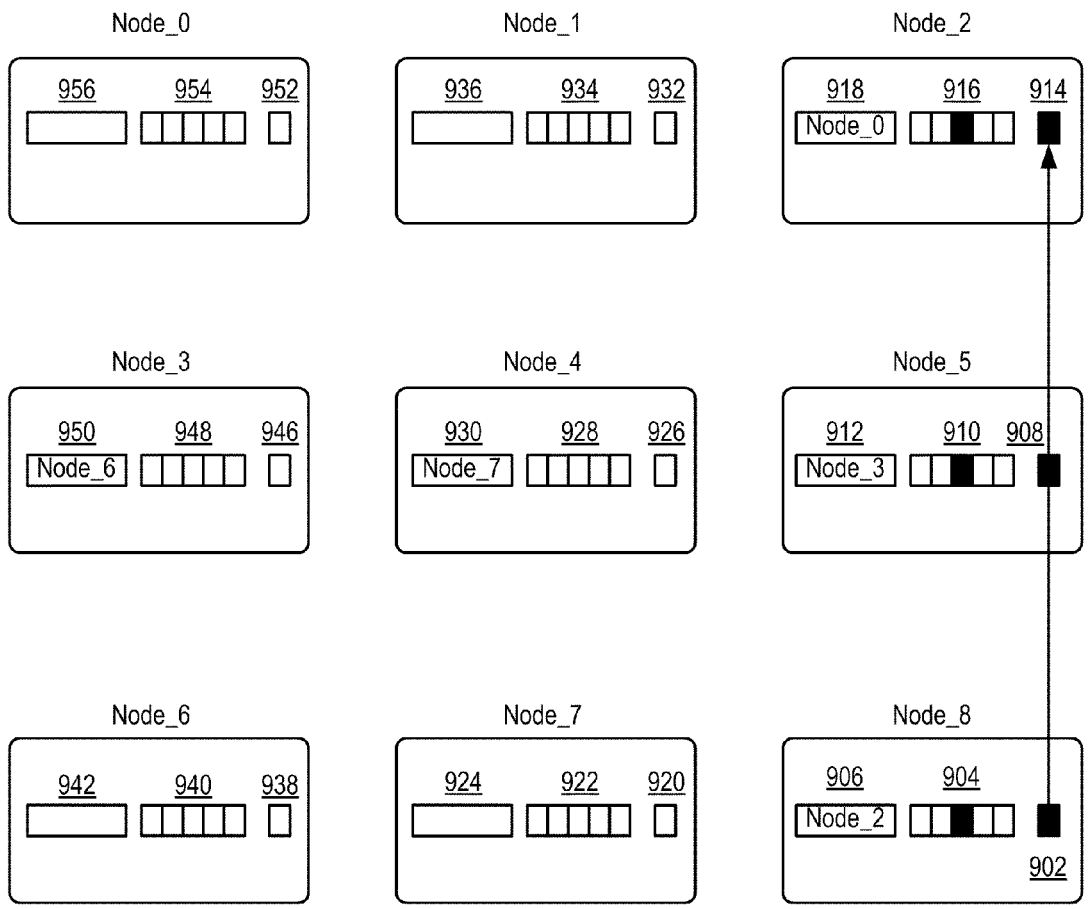
FIG. 10 sets forth a line drawing illustrating further exemplary data flow among a number of compute nodes configured in a network topology of a parallel computer in which hardware acceleration of broadcast operations is effected according to embodiments of the present invention.
Figure 11:
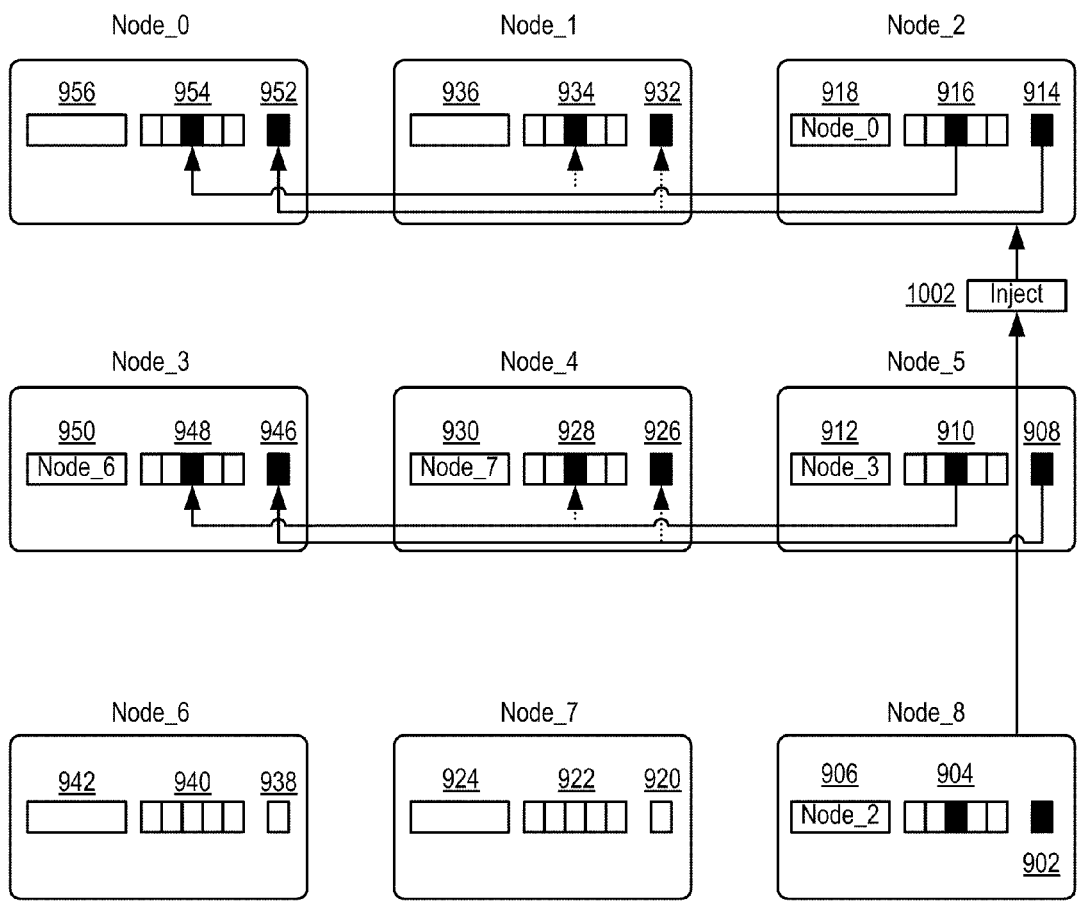
FIG. 11 sets forth a line drawing illustrating further exemplary data flow among a number of compute nodes configured in a network topology of a parallel computer in which hardware acceleration of broadcast operations is effected according to embodiments of the present invention.
Figure 12:
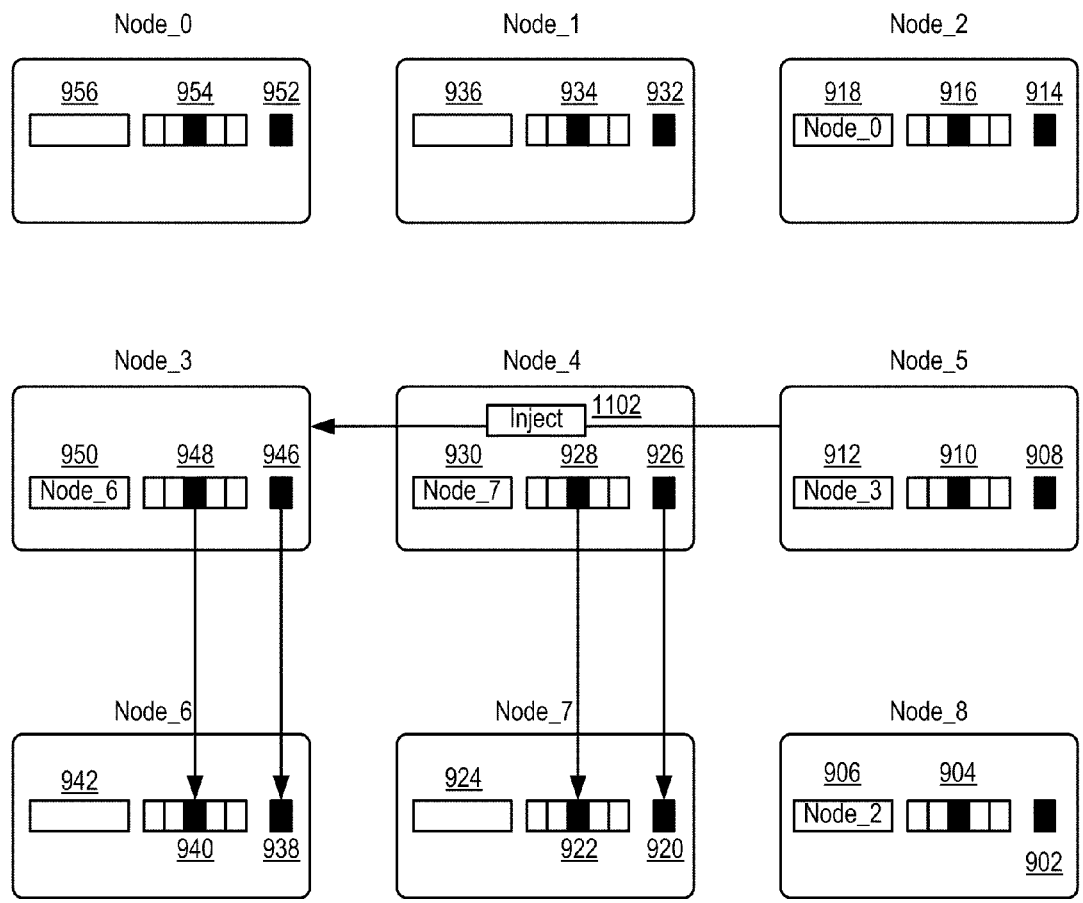
FIG. 12 sets forth a line drawing illustrating further exemplary data flow among a number of compute nodes configured in a network topology of a parallel computer in which hardware acceleration of broadcast operations is effected according to embodiments of the present invention.

For further explanation, FIG. 9 sets forth a line drawing illustrating exemplary data flow among a number of compute nodes configured in a network topology of a parallel computer in which hardware acceleration of broadcast operations is effected according to embodiments of the present invention. FIG. 10-12 each also set forth a line drawing illustrating further exemplary data flow among a number of compute nodes configured in a network topology of a parallel computer in which hardware acceleration of broadcast operations is effected according to embodiments of the present invention. That is, FIG. 9-12, each present a line drawing illustrating one state, or 'snapshot,' of data flow among a number of compute nodes configured in a network topology of a parallel computer in which hardware acceleration of broadcast operations is effected according to embodiments of the present invention.

FIG. 9 includes nine compute nodes (Node_0, Node_1, Node_2, Node_3, Node_4, Node_5, Node_6, Node_7, Node_8) organized for collective operations via a data communications network and each of the compute nodes has a receive buffer (954, 934, 916, 948, 928, 910, 940, 922, 904). Although not a limitation to all embodiments of the present invention, in the examples of FIG. 9-12, each compute node's receive buffer also operates as a send buffer, when data is broadcast to target node from that compute node. That is, for example, Node_8 receive buffer (904) also operates as a send buffer (904) when sending data to Node_2, a target node from Node_8's perspective.

In the example of FIG. 9, the compute nodes have been defined as part of an established network topology. Although compute nodes useful in effecting hardware acceleration of broadcast operations in a parallel computer in accordance with embodiments of the present invention may be established in any type of network topology, the compute node's in FIG. 9 are established in a square network topology. In the network topology, data communication links (958) among the compute nodes are depicted as dashed lines. Such data communications links (958) may be physical, logical, or both. In the example network topology, some nodes may communicate with other nodes only by means of an intermediary node. Any nodes, not directly connected by a data communications link (958) may only establish data communications only via an intermediary node. Consider, for purposes of explanation only, not limitation, that Node_8 may only communicate with Node_2 via an intermediary node, Node_5.

Each of the compute nodes in the example of FIG. 9 also includes a memory region allocated for storing a broadcast data length (952, 932, 914, 946, 926, 908, 938, 920, 902). Each of the compute nodes in the example of FIG. 9 also includes a memory location for storing a well-known memory address (956, 936, 918, 950, 930, 912, 942, 924, 906) of another compute node's receive buffer—that a memory location for storing a pointer to target compute node's receive buffer, although in the example of FIG. 9 only Node_2, Node_3, Node_4, Node_5, and Node_8 are presently storing a well-known memory address in such a location.

In the example of FIG. 9, Node_8 is operating as a root node and deposits broadcast data in a target node's (Node_2) receive buffer (916). Node_8 deposits the broadcast data, depicted as a shaded element of the receive buffer by performing a DMA operation with a well-known memory location (906) for the target node's receive buffer (916). In addition, the root node (Node_8) in the example FIG. 9, in preparing data chunks of the broadcast data to be sent to the target node (Node_2) via DMA, enabled a deposit flag. Node_8, the root node, passed the data chunks of the broadcast data via DMA operations to Node_5, an intermediary node, and upon receiving the broadcast data, Node_5 discovered the enabled deposit flag. Responsive to discovering the enabled deposit flag, Node_5 stored the broadcast data in Node_5's receive buffer (910). That is, without ever directly addressing data communications to Node_5 as a final destination of the data communications, the root node (Node_8) in the example of FIG. 9 has deposited broadcast data in the receive buffers (910 and 916) of Node_5 and Node_2. That is, the root node (Node_8), in sending the broadcast data to only one specified target compute node, effectively sends the broadcast data to two compute nodes. Consider, also that any number of compute nodes may operate as intermediaries between a root node and a final target node. In a network topology in which 100 compute nodes operate as intermediary compute nodes between (in terms of network topology data communications links) the root node and a final target node, for example, the root node may deposit broadcast data in the receive buffers of each of the 100 compute nodes, by merely depositing the data in the final target node's receive buffer with the deposit flag enabled.

For further explanation, FIG. 10 sets forth another line drawing illustrating a further exemplary data flow among the compute nodes of FIG. 9. In the example of FIG. 10, the data communication links have been removed for clarity of explanation, but the compute nodes in the example of FIG. 10 are coupled for data communications in exactly the same manner and network topology as the compute nodes in the example of FIG. 9.

In the example of FIG. 10, after depositing broadcast data in a target node via one or more DMA operations and depositing the broadcast data in the receive buffer (910) of the intermediary node (Node_5), in the same process, by enabling the deposit flag in data chunks delivered to the target node (Node_2), the root node (Node_8) deposits, in a memory region (914) designated for storing broadcast data length for the target node (Node_2), a length of the broadcast data. The root node deposits the broadcast data length in the memory region (914) by performing a DMA operation with a well-known memory location of the broadcast data length memory region. In addition, the root node (Node_8), in preparing the broadcast data length for DMA transfer to Node_2, also enabled the deposit flag. Upon receiving, by Node_5, the broadcast data length to pass on to Node_2, Node_5 stores the broadcast data length in its own memory region (908) responsive to discovering that the deposit flag is enabled.

For further explanation, FIG. 11 sets forth another line drawing illustrating a further exemplary data flow among the compute nodes of FIG. 10. In the example of FIG. 11, the data communication links have been removed for clarity of explanation, but the compute nodes in the example of FIG. 11 are coupled for data communications in exactly the same manner and network topology as the compute nodes in the example of FIGS. 9 and 10.

In the example of FIG. 11, the root node (Node_8), after sending along the broadcast data and data length to Node_2, and, by means of the deposit flag, Node_5, then triggers the target node (Node_2) to perform a next DMA operation. Node_8 triggers the target node by deposit, in a memory region designated for receiving injection instructions for the target node, an instruction (1002) to inject the broadcast data into the receive buffer of a subsequent target node (Node_0; Node_2's target node). In the process of depositing the injection instruction (1002) at Node_2, Node_8 in the example of FIG. 11 also enables a deposit flag in the injection instruction (1002). As such, Node_5, which receives the injection instruction (1002) as an intermediary node prior to passing the instruction (1002) along to Node_2, also stores the injection instruction (1002) locally and performs a DMA operation to send the broadcast data to Node_5's target node (Node_3). That is, by sending the injection instruction (1002)

to Node_2 with the deposit flag set, Node_8 in the example of FIG. 11 has triggered a DMA operation to be performed by both Node_2 and Node_5.

Node_2 and Node_5, in parallel or near parallel, may send along the broadcast data and broadcast data length to a target node. Node_2 is configured to deposit the broadcast data in Node_0's receive buffer and the broadcast data length in Node_0's broadcast data length memory region (952). Node_5 is configured to deposit the broadcast data in Node_3's receive buffer (948) and the broadcast data length in Node_3's broadcast data length memory region (946)

In the example of FIG. 11, both Node_2 and Node_5, before forwarding along the broadcast data and broadcast data length enable deposit flags for the broadcast data and broadcast data length. As such, intermediary nodes (Node_1 with respect to Node_2 and Node_4 with respect to Node_5), upon discovering the enabled deposit flags, store the broadcast data and broadcast data length before sending the data along.

For further explanation, FIG. 12 sets forth another line drawing illustrating a further exemplary data flow among the compute nodes of FIG. 11. In the example of FIG. 12, the data communication links have been removed for clarity of explanation, but the compute nodes in the example of FIG. 12 are coupled for data communications in exactly the same manner and network topology as the compute nodes in the example of FIGS. 9, 10, and 11.

In the example of FIG. 12, Node_5 has been configured to trigger Node_3, and all intervening or intermediary nodes, to perform another DMA operation. Node_5 triggers Node_3 and Node_4 to perform another DMA operation (forwarding along the broadcast data and data length), by sending an injection instruction (1102) to Node_3, via Node_4, with the deposit flag enabled. Upon receipt of the injection instruction (1102) by Node_3 and Node_4, both nodes forward along, with one or more DMA operations, the broadcast data and data length to Node_6 and Node_7, respectively.

The example of FIG. 12 is but one exemplary way in which the broadcast data may arrive at Node_6 and Node_7. In other embodiments, Node_8, in parallel, near parallel, or synchronously with depositing broadcast data and broadcast data length at Node_2 (see FIGS. 10 and 11), also deposits the broadcast data in Node_6's receive buffer where the broadcast data deposited in Node_6 also has the deposit flag enabled. In such an embodiment, only Node_8, the root node of the broadcast operation and network topology, need be configured to trigger further DMA operations (forwarding) with injection instructions and only one injection instruction need be deposited in the root node's target node. This is yet another way in which a broadcast operation may be carried out in accordance with embodiments of the present invention and is not limiting. In fact, with each different network topology, various algorithms and operations may be carried out in effecting hardware acceleration of broadcast operations in a parallel computer according to embodiments of the present invention, and each such algorithm and operation is well within the scope of the preset invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of effecting hardware acceleration of broadcast operations in a parallel computer, the parallel computer comprising a plurality of compute nodes organized for collective operations via a data communications network, each compute node having a receive buffer, the method comprising:
    establishing a network topology for the data communications network;
    selecting, in dependence upon the network topology, a schedule for a broadcast operation;
    depositing, by a root node of the topology, broadcast data in a target node's receive buffer, including performing a DMA operation with a well-known memory location for the target node's receive buffer;
    depositing, by the root node in a memory region designated for storing broadcast data length for the target node, a length of the broadcast data, including performing a DMA operation with a well-known memory location of the broadcast data length memory region; and
    triggering, by the root node, the target node to perform a next DMA operation, including depositing, in a memory region designated for receiving injection instructions for the target node, an instruction to inject the broadcast data into the receive buffer of a subsequent target node.

2. The method of claim 1 wherein depositing broadcast data further comprises:
    packetizing the broadcast data into one or more broadcast data packets; and
    enabling, in a header of the broadcast data packets, a deposit flag, the enabled deposit flag representing an instruction to any compute node receiving the broadcast data packet to store a copy of the broadcast data packet.

3. The method of claim 1 wherein depositing a length of the broadcast data further comprises:
    packetizing the length of the broadcast data into one or more broadcast data length packets; and
    enabling, in a header of the broadcast data length packets, a deposit flag, the enabled deposit flag representing an instruction to any compute node receiving the broadcast data length packet to store a copy of the broadcast data length packet.

4. The method of claim 1 wherein depositing an instruction to inject the broadcast data into the receive buffer of a subsequent target node further comprises:
    packetizing the instruction into one or more instruction packets; and
    enabling, in a header of the instruction packets, a deposit flag, the enabled deposit flag representing an instruction to any compute node receiving the instruction packets to store the instruction packets and perform another DMA operation.

5. The method of claim 1 wherein establishing within the network a topology further comprises:
    defining the compute nodes in the network topology; and
    initializing, by each compute node, a DMA data descriptor, the DMA data descriptor comprising:
    the compute node's receive buffer;
    the compute node's broadcast data length memory region; and
    a well-known memory location of another compute node's receive buffer.

6. The method of claim 5 further comprising depositing, by the target node, the broadcast data in the subsequent target node's receive buffer including performing a DMA operation with the well-known memory location of the subsequent target node's receive buffer included in the target node's DMA data descriptor and in accordance with the broadcast data length size stored in the target node's broadcast data length memory region.

7. An apparatus for effecting hardware acceleration of broadcast operations in a parallel computer, the parallel computer comprising a plurality of compute nodes organized for collective operations via a data communications network, each compute node having a receive buffer, the apparatus comprising a computer processor and a computer memory operatively coupled to the computer processor, the computer memory having disposed within it computer program instructions capable of:
    establishing a network topology for the data communications network;
    selecting, in dependence upon the network topology, a schedule for a broadcast operation;
    depositing, by a root node of the topology, broadcast data in a target node's receive buffer, including performing a DMA operation with a well-known memory location for the target node's receive buffer;

depositing, by the root node in a memory region designated for storing broadcast data length for the target node, a length of the broadcast data, including performing a DMA operation with a well-known memory location of the broadcast data length memory region; and triggering, by the root node, the target node to perform a next DMA operation, including depositing, in a memory region designated for receiving injection instructions for the target node, an instruction to inject the broadcast data into the receive buffer of a subsequent target node.

8. The apparatus of claim 7 wherein depositing broadcast data further comprises:

packetizing the broadcast data into one or more broadcast data packets; and enabling, in a header of the broadcast data packets, a deposit flag, the enabled deposit flag representing an instruction to any compute node receiving the broadcast data packet to store a copy of the broadcast data packet.

9. The apparatus of claim 7 wherein depositing a length of the broadcast data further comprises:

packetizing the length of the broadcast data into one or more broadcast data length packets; and enabling, in a header of the broadcast data length packets, a deposit flag, the enabled deposit flag representing an instruction to any compute node receiving the broadcast data length packet to store a copy of the broadcast data length packet.

10. The apparatus of claim 7 wherein depositing an instruction to inject the broadcast data into the receive buffer of a subsequent target node further comprises:

packetizing the instruction into one or more instruction packets; and enabling, in a header of the instruction packets, a deposit flag, the enabled deposit flag representing an instruction to any compute node receiving the instruction packets to store the instruction packets and perform another DMA operation.

11. The apparatus of claim 7 wherein establishing within the network a topology further comprises:

defining the compute nodes in the network topology; and initializing, by each compute node, a DMA data descriptor, the DMA data descriptor comprising:

the compute node's receive buffer;

the compute node's broadcast data length memory region; and a well-known memory location of another compute node's receive buffer.

12. The apparatus of claim 11 further comprising computer program instructions capable of depositing, by the target node, the broadcast data in the subsequent target node's receive buffer including performing a DMA operation with the well-known memory location of the subsequent target node's receive buffer included in the target node's DMA data descriptor and in accordance with the broadcast data length size stored in the target node's broadcast data length memory region.

13. A computer program product for effecting hardware acceleration of broadcast operations in a parallel computer, the parallel computer comprising a plurality of compute nodes organized for collective operations via a data communications network, each compute node having a receive buffer, the computer program product disposed in a computer readable storage medium, the computer program product comprising computer program instructions capable of:

establishing a network topology for the data communications network;

selecting, in dependence upon the network topology, a schedule for a broadcast operation;

depositing, by a root node of the topology, broadcast data in a target node's receive buffer, including performing a DMA operation with a well-known memory location for the target node's receive buffer;

depositing, by the root node in a memory region designated for storing broadcast data length for the target node, a length of the broadcast data, including performing a DMA operation with a well-known memory location of the broadcast data length memory region; and triggering, by the root node, the target node to perform a next DMA operation, including depositing, in a memory region designated for receiving injection instructions for the target node, an instruction to inject the broadcast data into the receive buffer of a subsequent target node.

14. The computer program product of claim 13 wherein depositing broadcast data further comprises:

packetizing the broadcast data into one or more broadcast data packets; and enabling, in a header of the broadcast data packets, a deposit flag, the enabled deposit flag representing an instruction to any compute node receiving the broadcast data packet to store a copy of the broadcast data packet.

15. The computer program product of claim 13 wherein depositing a length of the broadcast data further comprises:

packetizing the length of the broadcast data into one or more broadcast data length packets; and enabling, in a header of the broadcast data length packets, a deposit flag, the enabled deposit flag representing an instruction to any compute node receiving the broadcast data length packet to store a copy of the broadcast data length packet.

16. The computer program product of claim 13 wherein depositing an instruction to inject the broadcast data into the receive buffer of a subsequent target node further comprises:

packetizing the instruction into one or more instruction packets; and enabling, in a header of the instruction packets, a deposit flag, the enabled deposit flag representing an instruction to any compute node receiving the instruction packets to store the instruction packets and perform another DMA operation.

17. The computer program product of claim 13 wherein establishing within the network a topology further comprises:

defining the compute nodes in the network topology; and initializing, by each compute node, a DMA data descriptor, the DMA data descriptor comprising:

the compute node's receive buffer;

the compute node's broadcast data length memory region; and a well-known memory location of another compute node's receive buffer.

18. The computer program product of claim 17 further comprising computer program instructions capable of depositing, by the target node, the broadcast data in the subsequent target node's receive buffer including performing a DMA operation with the well-known memory location of the subsequent target node's receive buffer included in the target node's DMA data descriptor and in accordance with the broadcast data length size stored in the target node's broadcast data length memory region.

19. The computer program product of claim 13, wherein the computer readable storage medium comprises a transmission medium.

20. The computer program product of claim 13, wherein the computer readable storage medium comprises a recordable medium.

* * * * *